No. 861,370. PATENTED JULY 30, 1907.
J. M. LANSDEN, JR.
VEHICLE WHEEL.
APPLICATION FILED JUNE 23, 1905.

Witnesses:

Inventor
John M. Lansden Jr.
By Dyer & Dyer
Attorneys.

UNITED STATES PATENT OFFICE.

JOHN M. LANSDEN, JR., OF ORANGE, NEW JERSEY.

VEHICLE-WHEEL.

No. 861,370.  Specification of Letters Patent.  Patented July 30, 1907.

Original application filed October 14, 1904, Serial No. 228,417. Divided and this application filed June 23, 1905.
Serial No. 266,545.

*To all whom it may concern:*

Be it known that I, JOHN M. LANSDEN, Jr., a citizen of the United States, residing at Orange, county of Essex, State of New Jersey, have invented a certain new and useful Improvement in Vehicle-Wheels, of which the following is a description.

The object I have in view is to produce a wheel suitable for vehicles, but particularly automobiles, whereby the friction will be reduced, lubrication will be effected and dust excluded.

This application for patent is a division of Patent No. 824,797, dated July 3, 1906.

Figure 1:
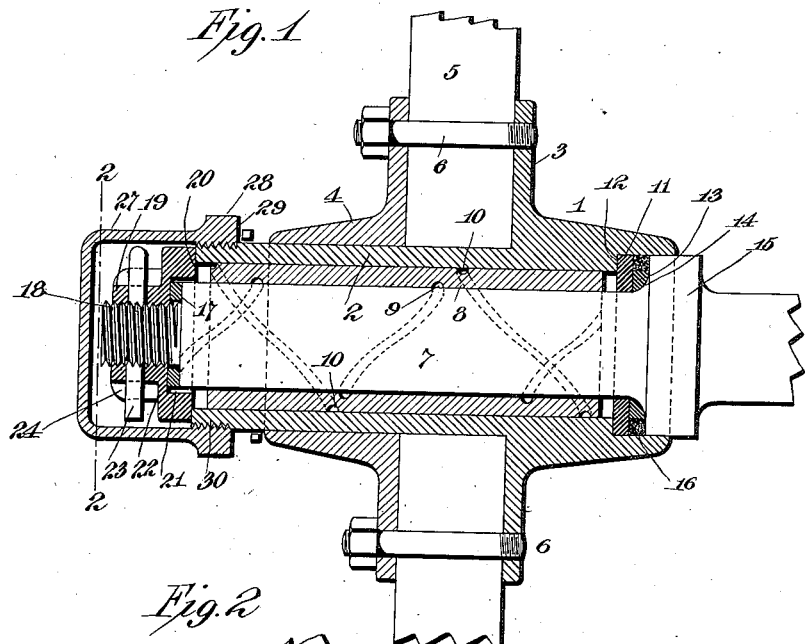
Figure 2:
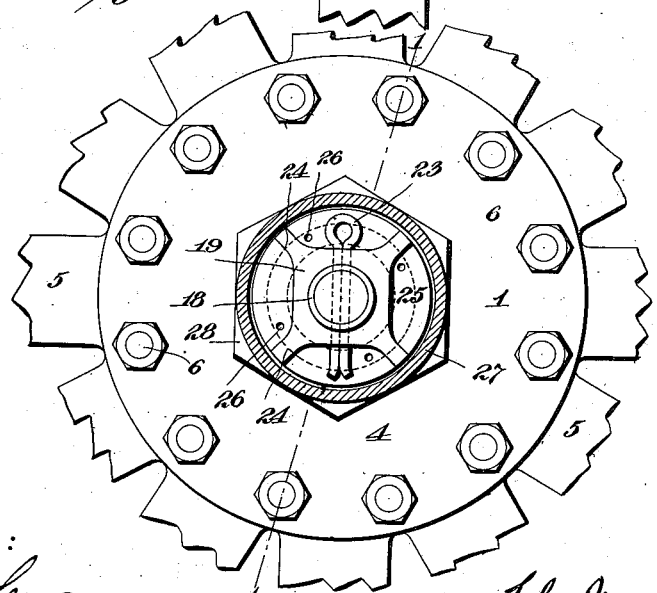

I attain the objects of my invention by the mechanism illustrated in the accompanying drawings, in which, Figure 1 is a sectional view of a hub taken on the lines 1—1 of Fig. 2. Fig. 2 is an end view partly in section taken on the lines 2—2 of Fig. 1.

In both of the views like parts are designated by the same reference characters.

In carrying out my invention I provide a hub 1, having a cylindrical bearing surface 2 and a flange 3. Surrounding the hub is a flanged collar 4 and between this collar and the flange 3 are secured the spokes 5, by means of bolts 6. Between the bearing surface 2 and the spindle 7 is a bushing or sleeve 8. This cylindrical bushing 8 is free to rotate upon the spindle 7 and within the hub 1. The inner surface of the bushing is provided with two or more spiral oil passages 9 and its outer surface is provided with similar passages 10. The passages on the inside of the bushing are arranged in the opposite direction from those on the outside, that is to say, if the passage 9 is a right hand passage, then the passage 10 on the outside will be a left hand one, causing the passage to be of opposite twist.

A ring 11 of fiber is arranged on the inner end of the hub and bears on a shoulder 12 formed thereon. Engaged with the ring 11 is a second ring 13 of fiber, which bears against the inclined portion 14 of the axle shoulder 15. The ring 13 is of less depth than the ring 11. Outside of the ring 13 is a ring 16 of felt or similar material. These rings constitute a dust excluding device.

The outer extremity of the spindle 7 is reduced forming a shoulder 17. The reduced portion is threaded at 18 for the reception of an end cap 19, the said cap being screwed thereto. The cap 19 is provided with a circular face portion 20, which bears against the hub 2 and a shoulder portion 21 adjacent to the shoulder 17 at the end of the spindle. Between these two portions is a washer 22 of any suitable material. The end cap 19 is prevented from accidental turning by means of a cotter 23. The end cap is screwed up until it pinches the washer 22. The circular face portion 20 will then engage with the end of the hub and force the latter inward. This action will compress the washers 11 and 13 and the latter engaging with the curved portion 14 of the enlargement 15 on the axle will be expanded, compressing the felt washer 16 between it and the hub, thereby producing an efficient dust excluding device and a means for preventing the escape of oil. The degree of compression of the felt washer 16 can be determined by the thickness of the washer 22, a greater or lesser thickness of the latter being employed as required.

The cap 19 is provided with wings 24 which with the barrel and the flange of the cap constitute oil chambers 25. An oil passage 26 in each chamber serves as a means of communication between the space between the axle and the hub and the outside of the cap.

A cylindrical dust cap 27, having a hexagonal portion 28 for attachment of a wrench and the threaded portion 29, engages with threads 30, formed upon the hub 1. The joint between the dust cap and the hub is oil tight, so that the dust cap may constitute a reservoir for lubricant. Communication between the reservoirs and bearing surfaces is made through the oil passages 26. Suitable means is provided for preventing accidental rotation of the cap 27, an approved means being disclosed in my Patent No. 824,797, previously referred to.

In order to get the best results from the bearing surfaces, the spindle hub and bushing should be of different material and the thickness of the bushing should bear a determined relation to the frictional character of the materials. If, as an instance, as I have found in practice, the hub be made of malleable iron and the spindle of steel, the bushing made of bronze and softer than the spindle or hub, and the half diameter of the spindle being seven eighths of an inch and the half diameter of the central bore of the hub being one and one-eighth inches, leaving a separating space of one-quarter of an inch and the bushing of sufficient thickness to make a close fit, and the parts being properly lubricated the surface between the hub and bushing and between the bushing and spindle will each have the same frictional characteristics, that is to say, the friction will be transferred to both surfaces in about equal amounts, and the bushing will rotate at less speed than the hub. This will greatly reduce the friction and will double the oil area. The hub being rotated will supply oil from the cap 27 which serves as a reservoir. From the reservoir the oil will pass through the oil passages 26 to the space between the spindle and the hub. The cap 27 being mounted upon the hub will rotate therewith causing the oil to be circulated around the wings of the cap 24, keeping all of the chambers supplied with lubricant. The bushing being in constant rotation with the wheel the oil will be moved through one of the spiral passages 9 or 10 into the bushing in one direction and return in the other direction, passing out through the lowermost oil passage 26 into the dust cap 27. It is to be noted that the bushing is free to move longitudinally upon the spindle to a limited extent but it cannot pass beyond the confines of the cap 19 and the ring 11.

Having now described my invention what I claim and desire to secure by Letters Patent, is:—

1. The combination with a cylindrical spindle, of a cylindrical bushing mounted thereon and free to turn, the said bushing having spiral grooves, a hub mounted on the bushing and free to turn thereon, and an oil reservoir at one end of the spindle there being oil passages communicating with the reservoir, the bushing being shorter than the spindle and free to move longitudinally thereon.

2. The combination with a cylindrical spindle, of a cylindrical bushing mounted thereon and free to turn, the said bushing having spiral grooves, a hub mounted upon the bushing and free to turn thereon, an oil reservoir at one end of the spindle and rotating with the hub and a cap on the spindle and within the reservoir, the said cap having wings, with oil passages between the wings communicating with the reservoir and grooves.

3. The combination with a spindle, of a loose bushing surrounding the same, and a hub surrounding the bushing and free to turn thereon, the spindle, hub and bushing being of different materials and the thickness of the bushing being so proportioned that the surfaces between the hub and bushing and between the bushing and spindle will have the same frictional characteristics, whereby the bushing will rotate at less speed than the hub.

4. The combination with a cylindrical spindle, of a loose cylindrical bushing shorter than the spindle and surrounding the same, and free to turn thereon, the spindle, hub and bushing and free to turn thereon, the spindle, hub and bushing being of different materials and the thickness of the bushing being so proportioned that the surfaces between the hub and bushing and between the bushing and spindle will have the same frictional characteristics, whereby the bushing will rotate at less speed than the hub, and will be free to move longitudinally on the spindle.

This specification signed and witnessed this second day of May, 1905.

JOHN M. LANSDEN, Jr.

Witnesses:
A. H. WHITING,
CHAS. F. SCHUTTER.